United States Patent
Caharel et al.

(10) Patent No.: US 7,103,155 B2
(45) Date of Patent: Sep. 5, 2006

(54) NOTIFICATION OF THE PRESENCE OF MESSAGES DEPOSITED IN A VOICEMAIL SERVER

(75) Inventors: Marie-Hélène Caharel, Chateaugiron (FR); Olivier Louvet, Lannion (FR)

(73) Assignee: France Telecom, Paris (FR)

( * ) Notice: Subject to any disclaimer, the term of this patent is extended or adjusted under 35 U.S.C. 154(b) by 268 days.

(21) Appl. No.: 10/203,711

(22) PCT Filed: May 15, 2001

(86) PCT No.: PCT/FR01/01463

§ 371 (c)(1),
(2), (4) Date: Aug. 13, 2002

(87) PCT Pub. No.: WO01/91431

PCT Pub. Date: Nov. 29, 2001

(65) Prior Publication Data

US 2003/0021393 A1 Jan. 30, 2003

(30) Foreign Application Priority Data

May 23, 2000 (FR) .......................................... 00 06720

(51) Int. Cl.
*H04M 11/00* (2006.01)

(52) U.S. Cl. .............................. 379/88.12; 379/88.16; 379/88.18; 379/201.01; 379/207.02

(58) Field of Classification Search ................ 379/67.1, 379/69, 88.12, 88.22, 88.16, 88.18, 88.23, 379/88.25, 88.27, 201.01, 201.02, 207.02
See application file for complete search history.

(56) References Cited

U.S. PATENT DOCUMENTS

| 4,878,240 A | * | 10/1989 | Lin et al. ................. 379/88.22 |
| 5,905,774 A | | 5/1999 | Stacey et al. ............ 379/88.04 |
| 6,351,524 B1 | * | 2/2002 | Schuster et al. ......... 379/88.23 |
| 6,643,360 B1 | * | 11/2003 | Reine ....................... 379/93.24 |
| 2003/0053143 A1 | * | 3/2003 | Maeda ....................... 358/440 |

FOREIGN PATENT DOCUMENTS

| EP | 0 588 101 | | 3/1994 |
| EP | 0 689 336 | | 12/1995 |
| JP | 07030663 A | * | 1/1995 |

* cited by examiner

Primary Examiner—Fan Tsang
Assistant Examiner—Ovidio Escalante
(74) Attorney, Agent, or Firm—Lowe Hauptman Gilman & Berner, LLP

(57) ABSTRACT

To relieve a user of a first fixed or mobile terminal from consulting messages deposited in a voicemail server, the voicemail server notifies the first terminal of the presence of a deposited message associated with the identifier of a second terminal, immediately after off-hooking and transmission of the identifier. The message is transmitted to the first terminal only if the user wishes to listen to it so as to decide whether or not to hold the call to the second terminal. Otherwise, it proceeds with the setting up of the call to the second terminal.

8 Claims, 3 Drawing Sheets

NOTIFICATION OF THE PRESENCE OF MESSAGES DEPOSITED IN A VOICEMAIL SERVER

REFERENCE TO RELATED APPLICATION

This application is a continuation of the PCT International Application No. PCT/FR01/01463 filed on May 15, 2001, which is based on the French Application No. 00-06720 filed on May 23, 2000.

BACKGROUND OF THE INVENTION

1. Field of the Invention

The present invention relates to a method of notifying a user to whom a message is addressed, of the depositing of the message in an electronic mail service of a telecommunication network, such as a switched telephone network or a radiotelephony network.

2. Description of the Prior Art

Servers for notifying deposited messages are at present designed so that notifications are transmitted either periodically, or as soon as a first user comes off-hook, to the first user terminal for which the messages are intended, to indicate to the first user that he has received messages.

If the first user has received a large number of messages, for example during a long absence, the message notification service does not offer the facility to identify among all the messages those which originate from a second user. The first user must listen sequentially to the new messages that have been deposited in the mail service during his absence until he reaches the messages deposited by the second user.

If the first user wishes to communicate quickly with the second user, without listening to all the deposited messages, or after listening to only some of them, the first user calls the second user, taking the risk of not knowing information that the second user may have transmitted him in the deposited messages, and that the second user may think the first user has listened to.

OBJECT OF THE INVENTION

The object of the present invention is to provide a method of notifying of the depositing of a message in a mail service informing the first user immediately if the second user that he wishes to call has left him a message, thereby relieving the first user of the constraint of consulting all the messages deposited in the voicemail service before setting up a call if the first user wishes to communicate quickly with the second user.

SUMMARY OF THE INVENTION

To this end, a method of notifying a first terminal of a message deposited by a second terminal in a voicemail server associated with the first terminal, is characterized in that, after a request to call the second terminal from the first terminal, the method comprises the following steps:

transmitting to the voicemail server an identifier of the second terminal supplied by the first terminal, looking for the transmitted identifier in a new message table of the voicemail server that maps non-listened messages transmitted by terminals and intented for the first terminal and identifiers of said terminals, from the voicemail server notifying to the first terminal of the presence of a message associated with the identifier of the second terminal and found in the new message table, transmitting said message from the voicemail server to the first terminal to listen to the message in response to a message listening request from the first terminal, and from the voicemail server notifying the first terminal of a prompt to confirm or cancel the setting up of the call of the second terminal after listening to said message.

Accordingly, in accordance with the invention, any new message deposited in the voicemail server by the user of a second terminal is systematically signaled to the first user as soon as the first user calls the second user, without constraining the first user to listen to other new messages deposited. Nevertheless, the invention does not impose listening to the new message or messages transmitted by the second terminal, since the first user can decline to listen to a message, in which case the requested call is set up.

In different embodiments of the invention, the identifier of the second terminal transmitted to the voicemail server is supplied by the first terminal by entering the identifier on the keypad of the first terminal or by speaking the identifier into the first terminal if the server has a voice recognition device.

In a preferred embodiment of the invention, the voicemail server contains a directory set up from the first terminal and mapping telephone numbers of terminals and alphanumeric labels, the identifier of a terminal being the telephone number and/or the label of that terminal.

The directory is constructed by the user via the first terminal, preferably before using the service in accordance with the invention, and subsequently as and when he consults messages deposited by new users. Accordingly, after the step of transmitting said message to the first terminal when the identifier of the second terminal is the telephone number of the latter and is not included in the directory, the method of the invention comprises the following steps:

from the voicemail server notifying the first terminal of a prompt to add to the directory a label of the second terminal in correspondence with the telephone number, proceeding to the step of notifying the setting up of the call, in response to the first terminal declining to add a label of the second terminal to the directory, from the voicemail server notifying the first terminal of a label request, in response to the first terminal confirming addition of the label to the voicemail server, and transmitting said label from the first terminal to the voicemail server and proceeding to the step of notifying the setting-up of the call.

As a general rule, after listening to the found message, or declining to listen to the found message, the voicemail server is transferring the found message with the identifier of the second terminal from the new message table to an old message table which can be consulted afterwards.

In practice, a response from the first terminal at a step of notifying from the voicemail server is a DTMF code or a voice message if the voicemail server comprises a voice recognition device.

The invention also relates to a voicemail server implementing the method of the invention connected to switching and service access means of a public switched telephone network when the first terminal is a fixed terminal, or of a radiotelephony network if the first terminal is a mobile radiotelephone terminal. The voicemail server is characterized in that it comprises means for looking for an identifier of the second terminal supplied by the first terminal to the voicemail server via the switching and service access means in a new message table of the voicemail server that maps non-listened messages transmitted by terminals and intented for the first terminal and identifiers of said terminal, following a request to call a second terminal from the first terminal, and for transmitting to the first terminal a notification of the presence of a message associated with the identifier of the second terminal and found in the new message table.

BRIEF DESCRIPTION OF THE DRAWINGS

Other features and advantages of the present invention will become more clearly apparent on reading the following description of plural preferred embodiments of the invention, which is given with reference to the corresponding accompanying drawings, in which.

DETAILED DESCRIPTION OF THE PREFERRED EMBODIMENTS

Figure 1:
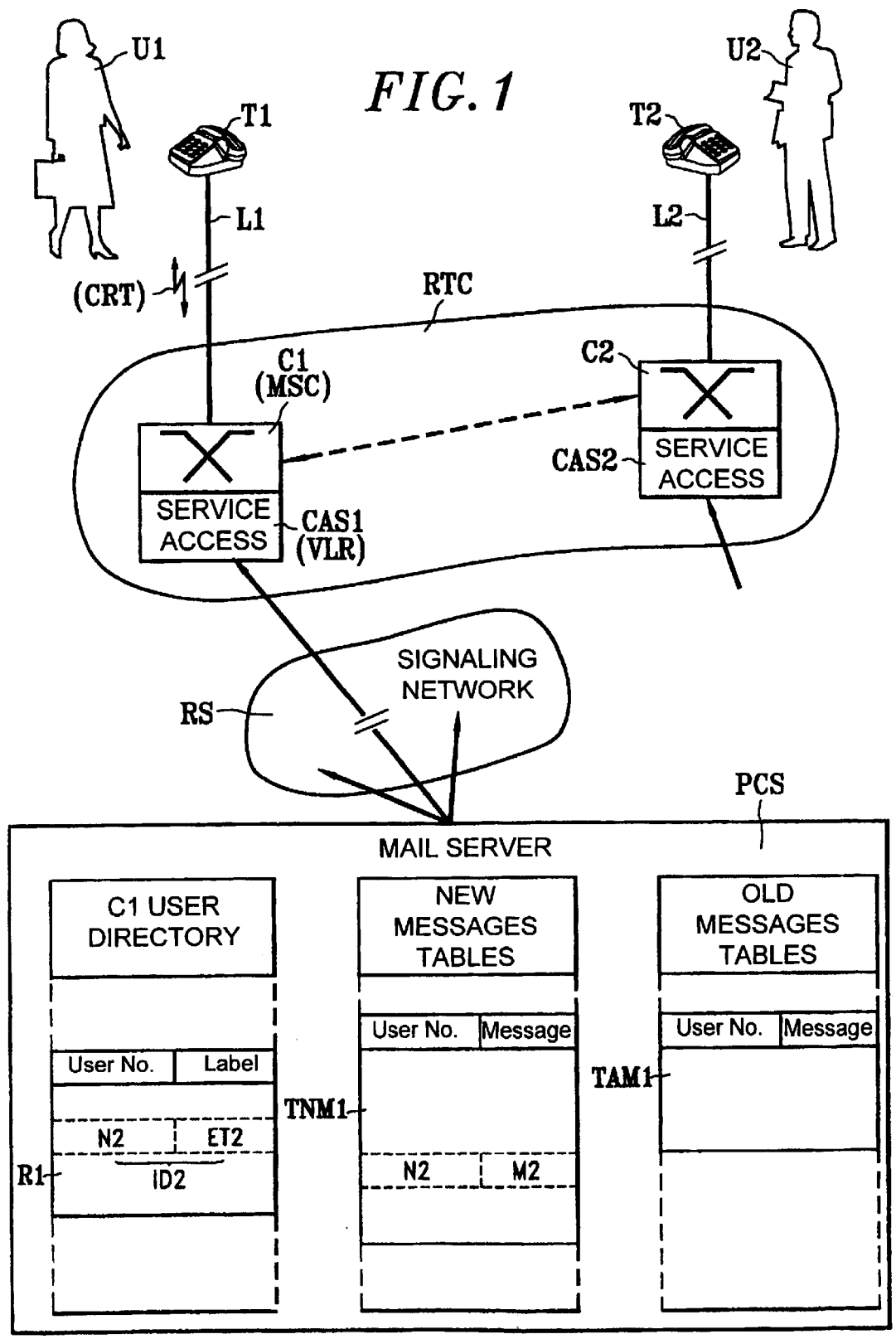
FIG. 1 is a block diagram of a message notification system for implementing the method.

Referring to FIG. 1, a first embodiment of a notification system for implementing the notification method according to the invention is described in the context of a fixed switched telephone network RTC and in relation to two users U1 and U2 having two telephone terminals T1 and T2 respectively connected to routing autonomy exchanges C1 and C2 via user telephone lines L1 and L2. In a variant the terminals T1 and T2 are connected to the same exchange C1. The telephone lines L1 and L2 conventionally comprise a pair of conductor wires and transmit analog signals, and in particular voice notification messages, from the exchange to the terminals and user responses in dual tone multifrequency (DTMF) code to the exchanges.

The notification service offered by the invention to the first user U1 is incorporated into the signaling network RS associated with the telephone network RTC, providing diverse functions associated with diverse services offered to users. Accordingly, in the intelligent network, each exchange C1, C2 has a service function referred to as the service access switch CAS1, CAS2. In a given geographical area, a plurality of service access switches are connected via the signaling network RS to a service server also known as a service control point PCS.

The server PCS in the embodiment shown in FIG. 1 incorporates at least voicemail services, analogous to telephone answering and recording equipments, for user terminals, such as the user terminal T1, served by the exchange C1. The voicemail server PCS includes a voice recognition device so that it can accept either spoken instructions or instructions in DTMF code from the user terminals, such as the terminals T1 and T2. In a variant the server PCS does not include any voice recognition system or DTMF code detecting device.

It is known in the art that the mail facility associated with the terminal T1 in the server PCS includes two tables TNM1 and TAM1 mapping deposited messages M intended for the terminal T1 and telephone numbers N of terminals sending the messages, such as the second terminal T2. The first table TMN1 relates to messages deposited recently that have not yet been consulted by the user U1 of the terminal T1. The second table TAM1 relates to old messages intented for the user U1, who has already consulted them and decided to store them until they are consulted again or deleted manually or automatically.

In accordance with the invention, the correspondence tables TMN1 and TAM1 of the voicemail facility for the user U1 are associated with a directory R1 of user telephone numbers N for the user U1 with associated labels ET. For example, a label can comprise the name, or the nickname, or an abbreviated name, or an alphanumeric word designating a user and associated with his telephone number. In the context of the invention, the number N, or the label ET, or the combination of the number and the label, of a user in the directory constitutes a user identifier ID.

In order to describe this first embodiment of the notification method according to the invention, it is assumed that the first user U1 subscribes to the notification service using the method of the invention; consequently, an indication of the user's subscription is contained in the service access switch CAS1 connected to the terminal T1 in order to initiate the method of the invention each time that the terminal T1 of the user U1 signals seizing of the line L1, i.e. goes off-hook, to the exchange C1. In response to this off-hook condition, the service access switch CAS1 activates consultation of the mail facility associated with the terminal T1, in particular by transmitting an identification number of the user U1, for example his telephone number, in order to select in the server PCS the voicemail facility associated with the terminal T1.

Figure 2:
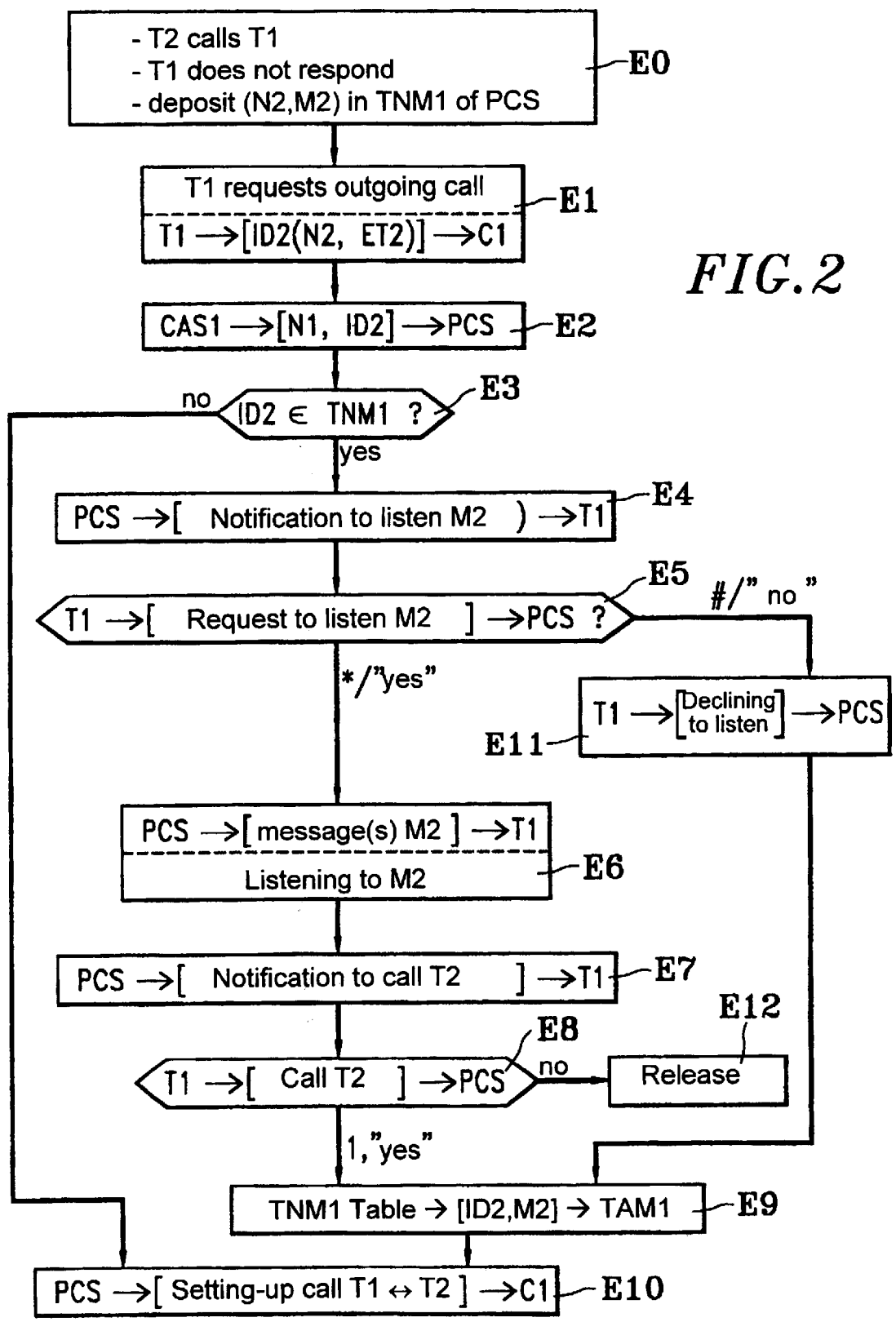
FIG. 2 is an algorithm of the main steps of a message notification method according to the invention.

Initially, in a step E0 shown in FIG. 2, the user U2 of the terminal T2 has called the terminal T1, the terminal T1 has not responded because the user U1 is absent, and the voicemail service in the server PCS has prompted the user U2 to deposit a voice message M2 in order to store it in the new message table TMN1 with the telephone number N2 of the terminal T2 that the exchange C2 has transmitted to the server PCS via the exchange C1 and the switch CAS1.

The notification method according to the invention shown in FIG. 2 essentially comprises ten steps E1 to E10.

In a first step E1, the user U1 decides to call the user U2. The terminal T1 seizes the line L1 resulting from an off hook action, i.e. when the user U1 presses a hands-free key or lifts the handset of the terminal T1. In response to this outgoing call request, the exchange C1 transmits dial tone to the terminal T1, which transmits to the exchange C1 the identifier ID2 of the terminal T2 entered by the user U1. The identifier ID2 can be the telephone number N2 of the user U2 entered via the keypad of the terminal T1 by the user U1, or the label ET2 of the terminal T2, for example the name of the user U2, spoken into the microphone of the terminal T1 by the user U1 if the label ET2 has already been entered into the directory R1.

After verifying that the subscriber profile of the user U1 indicates that he has subscribed to the notification service according to the invention, and in response to the outgoing call request in the preceding step E1, in step E2 the switch CAS1 transmits a message to activate the voicemail facility associated with the terminal T1 in the voicemail server PCS. The activation message contains the call number N1 of the terminal T1, constituting a mail address, and the identifier ID2 of the user U2, constituting an address of a message stored in the mail service.

In step E3 the voicemail server PCS looks for any message M2 which is associated with the identifier ID2 of the terminal T2 and stored in the table TNM1. This is done by comparing the received identifier ID2 with the identifiers contained in the new message table TNM1 associated with the terminal T1, if necessary by consulting the directory R1 if the identifier ID2 is the label ET2. If no message has been deposited by the user U2, the next step is the final step E10, consisting of withdrawing the intervention of the service access function CAS1 in the exchange C1 and thereby continuing to set up the outgoing call between the exchanges C1 and C2.

Otherwise, if a message M2 is found in the new message table TNM1, the voicemail server PCS transmits to the terminal T1 a notification to listen to the message M2 via the switch CAS1 and the exchange C1 in step E4. The notification to listen to the message is the following voice message, for example: "your voicemail includes a message from N2" if the user entered the number N2 in step E1, or "ET2 has left you a message", if the user U1 spoke the label ET2 in step E1. The notification to listen of step E4 is followed by the additional message "if you want to listen to the message, press the star key, or if you prefer to go direct to setting up the call, press the hash key", if the voicemail service in the server PCS has no voice recognition device. If the server PCS has a voice recognition device, the additional message is instead "if you wish to listen to the message, say YES, or if you prefer to go direct to setting up the call say NO", or a combination of the two additional messages is transmitted.

In the next step E11, if the terminal T1 has sent the server PCS a message declining to listen, by pressing the # key on the keypad of the terminal T1 or saying "NO", the method continues with step E9 described below.

In response to the user pressing the * key or saying "YES" in step E5, in the next step E6 the server PCS sends the terminal T1 the message M2 read in the new message table TMN1 with the associated identifier ID2 transmitted in step E2. If several messages M2 from the user U2 have been stored in the table TMN1 associated with the user U1 in the server PCS, the user U1 uses a "Next" command associated with a predetermined key of the keypad of the terminal T1 to consult the successive messages M2.

After the user has consulted the message or messages M2, in step E7 the voicemail server PCS transmits to the terminal T1 a notification to call the terminal T2, in order for the terminal T1 to confirm or cancel the setting up of the call to the terminal T2. This second notification can be the following voice message, for example: "to confirm the call to T2, press 1" and/or "or say YES", depending on whether the voicemail service in the server PCS has a voice recognition device or not. If in step E8 the user U1 does not wish to call the user U2 after listening to the message or messages M2, he hangs up or presses an on-hook key on the keypad of the terminal T1, which releases the line L1 in step E12.

Otherwise, the terminal T1 confirms the call to the terminal T2 to the server PCS in step E8 by pressing the 1 key or saying "YES". Following step E8 or step E11, in step E9 the message or messages M2 that have just been consulted in the new messages table TMN1 are transferred with the telephone number N2 of the terminal T2 into the old message table TAM1.

Finally, in step 10, the server PCS confirms the setting up of the outgoing call between the terminals T1 and T2 to the exchange C1, eliminating the intervention of the switch CAS1 in further processing of the call.

Figure 3:
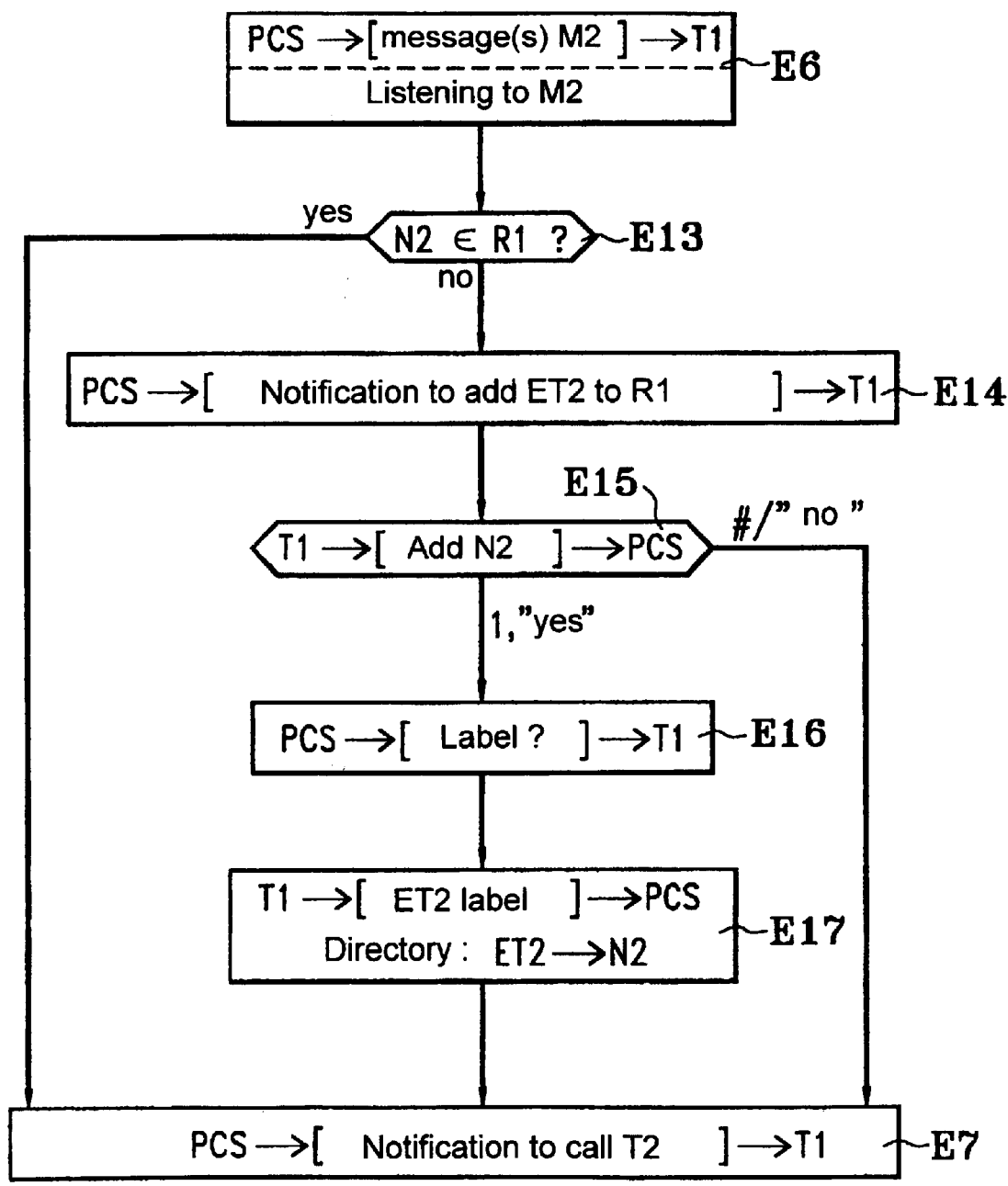
FIG. 3 is an algorithm of supplementary steps of the message notification method according to the invention, relating to adding a user label to a directory.

In a more comprehensive embodiment with reference to FIG. 3, the notification method further includes steps E13 to E17 between steps E6 and E7. After the user has listened to the message or messages M2 in step E6, the supplementary steps consist of adding the caller to the directory R1 of the user U1 if, in an initial step E13, the server PCS determines that the directory R1 does not yet list the telephone number N2 of the second terminal T2 constituting the identifier ID2 supplied by the first terminal T1 to the server PCS in step E2 and corresponding to at least one new message M2 that has just been listened to in step E6. Otherwise, the directory is not modified (step E13, yes) and step E7 is executed.

After step E13, in step E14 the server PCS transmits to the terminal T1 a notification prompting it to add the label ET2 in correspondence with the telephone number N2 to the directory R1. This notification can be as follows: "if you would like to add this user to your directory, press 1, or if not press the # key", if the server PCS does not include a voice recognition device, or: "if you wish to add this number to your directory, say YES, or if not say NO", if the server PCS includes a voice recognition device.

In response to confirmation of adding the label in the form of the DTMF code "1" or the word "YES" in step E15, in step E16 the server PCS transmits to the terminal T1 another notification to ask "which label is to be associated with the call number N2". The user U1 enters the label ET2 on the keypad of the terminal T1, or speaks the label ET2 into the microphone of the terminal T1 if the server PCS has already indicated that it includes a voice recognition device by prompting the user to say "YES" or "NO", in particular in the preceding step E13. Accordingly, in step E17, the label ET2 is transmitted from the terminal T1 to the server PCS and entered in the directory R1 with the associated telephone number N2. It is recalled that the label ET2 can be the name, or a nickname, or an abbreviated number, or any other alphanumeric word for the user U2.

Then, after step E17, or after step E15 if the user has pressed the # key or said "NO", the method proceeds to step E7 already described with reference to FIG. 2.

In a second embodiment of the invention, for which the reference numbers appear in brackets in FIG. 1, the terminal T1 is a mobile radiotelephone terminal connected to a base station of a radiotelephony network via a traffic radio channel CRT replacing the line L1. The equivalent of the exchange C1 in the network RTC is the mobile services switching center MSC serving the base station previously cited, to which the radiotelephone terminal is temporarily connected. In the fixed network of the radiotelephony network, there is a service access function equivalent to the switch CAS1 and associated with the combination of the mobile services switching center MSC and the visitor location register VLR associated therewith and containing the subscriber profile of the mobile terminals in its location area, together with at least one voicemail server equivalent to the server PCS and connected to a plurality of mobile services switching centers MSC via the signaling network of the radiotelephony network. The address of the voicemail server PCS associated with the mobile terminal T1 is included in the subscriber profile stored temporarily in the register VLR and permanently in the home location register HLR of the radiotelephony network.

Consequently, with the exception of the interchanging of the functions in step E1, during which the identifier ID2 is first entered in the mobile telephone T1, followed by the user of terminal T1 requesting setting up of the outgoing call by pressing the off-hook traffic channel seizing key, the process steps E0 to E17 described above for fixed terminals in the switched telephone network RTC are equally applicable to mobile radiotelephone terminal in a radiotelephony network.

The scope of the invention is independent of the fixed or mobile nature of the user terminals: the terminals T1 and T2 can both be fixed terminals or mobile terminals, or one of them can be a fixed terminal and the other a mobile terminal.

What we claim is:

1. A method of notifying a first terminal of a message deposited by a second terminal in a voicemail server associated with said first terminal, the method being performed, after a request to call said second terminal from said first terminal, the method comprises the following steps:

transmitting to the voicemail server an identifier of said second terminal supplied by said first terminal, looking for the second terminal identifier in a new message table of said voicemail server that maps identifiers of any second terminals and non-listened messages transmitted by any second terminals and intented for said first terminal, from said voicemail server notifying said first terminal of the presence of a message associated with the identifier of said second terminal and found in said new message table, transmitting said message from said voicemail server to said first terminal to listen to said message in response to a message listening request from said first terminal, and from said voicemail server notifying said first terminal of a prompt to confirm/cancel the setting up of the call of said second terminal after listening to said message.

2. A method according to claim 1 wherein said identifier of said second terminal transmitted to said voicemail server is supplied by the first terminal by entering said second terminal identifier by speaking said identifier into said first terminal.

3. A method according to claim 1 wherein said voicemail server includes a directory set up from said first terminal and mapping telephone numbers of any second terminals and alphanumeric labels, the identifier of each any second terminal being one of the telephone number and the label of said any second terminal.

4. A method according to claim 3 further comprising the following steps after the step of transmitting said message to said first terminal when said identifier of said second terminal is the telephone number of said second terminal and is not included in said directory:

from said voicemail server notifying said first terminal of a prompt to add to said directory a label of said second terminal in correspondence with said telephone number of said second terminal, proceeding to the step of notifying to confirm/cancel the setting up of the call, in response to said first terminal declining to add said label of said second terminal to said directory, from said voicemail server notifying said first terminal of a label request, in response to said first terminal confirming label addition to said voicemail server, and transmitting said label of said second terminal from said first terminal to said voicemail server and proceeding to the step of notifying to confirm/cancel the setting-up of the call.

5. A method according to claim 1 comprising, in said voicemail server, transferring the found message with said identifier of said second terminal from said new message table to an old message table.

6. A method according to claim 1 wherein a response from said first terminal at a step of notifying from said voicemail server is a voice message.

7. A voicemail server connected to switching and service access means in a telephone network including at least a first terminal and other any terminals including a second terminal, said voicemail server comprising a new message table mapping identifiers of said any terminals and non-listened messages transmitted and deposited by said any terminals and intented for said first terminal, a processing arrangement for looking for an identifier of said second terminal which is supplied by said first terminal to said voicemail server via said switching and service access means, in said new message table of said voicemail server responsive to a request from said first terminal to call said second terminal, and a transmitter for transmitting to said first terminal a notification of the presence of a message associated with said identifier of said second terminal and found in said new message table.

8. A voicemail server according to claim 7 comprising a directory derived from said first terminal for mapping telephone numbers of said any terminals and alphanumeric labels.

* * * * *